United States Patent
Conover et al.

(10) Patent No.: US 10,394,624 B2
(45) Date of Patent: *Aug. 27, 2019

(54) ATTACHING APPLICATIONS BASED ON FILE TYPE

(71) Applicant: VMware, Inc., Palo Alto, CA (US)

(72) Inventors: Matthew Conover, Mountain View, CA (US); Rajesh H. Parekh, Los Altos, CA (US); Jairam Choudhary, Sunnyvale, CA (US); Fei Huang, Fremont, CA (US); Gregory Tauglich, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,275

(22) Filed: Jun. 27, 2016

(65) Prior Publication Data
US 2017/0024264 A1    Jan. 26, 2017

Related U.S. Application Data

(63) Continuation of application No. 14/206,859, filed on Mar. 12, 2014, now Pat. No. 9,378,040.

(60) Provisional application No. 61/784,074, filed on Mar. 14, 2013.

(51) Int. Cl.
*G06F 9/54*      (2006.01)
*G06F 9/445*     (2018.01)
*G06F 9/455*     (2018.01)
*G06F 8/60*      (2018.01)

(52) U.S. Cl.
CPC .......... *G06F 9/542* (2013.01); *G06F 9/44505* (2013.01); *G06F 9/45558* (2013.01); *G06F 8/60* (2013.01); *G06F 2009/45579* (2013.01); *G06F 2009/45583* (2013.01)

(58) Field of Classification Search
CPC ................. G06F 9/542; G06F 9/45558; G06F 2009/45583
See application file for complete search history.

(56) References Cited

U.S. PATENT DOCUMENTS

| | | | | |
|---|---|---|---|---|
| 6,047,312 A | * | 4/2000 | Brooks | G06F 9/465 709/203 |
| 6,356,915 B1 | | 3/2002 | Chtchetkine et al. | |
| 2003/0074393 A1 | * | 4/2003 | Peart | G06F 9/547 709/203 |
| 2003/0084096 A1 | | 5/2003 | Starbuck et al. | |
| 2005/0071378 A1 | * | 3/2005 | Smith | G06F 9/445 |
| 2006/0224694 A1 | | 10/2006 | Lai | |
| 2011/0282831 A1 | | 11/2011 | Huang et al. | |
| 2013/0282755 A1 | | 10/2013 | Procopio et al. | |

* cited by examiner

*Primary Examiner* — Syed A Roni

(57) ABSTRACT

Disclosed herein are systems, methods, and software for attaching applications to a computing device based on a file type selection. In one example, a method for operating an application attaching system to dynamically make applications available to a computing device includes identifying an application attach triggering event based on a file selection of a certain file type on the computing device. The method further includes, in response to the application attach triggering event, identifying an application within an application volume based on the certain file type. The method also includes attaching the application volume to computing device, and associating the application to the certain file type on the computing device.

20 Claims, 6 Drawing Sheets

ATTACHING APPLICATIONS BASED ON FILE TYPE

RELATED APPLICATIONS

This application is a continuation of U.S. patent application Ser. No. 14/206,859, entitled "ATTACHING APPLICATIONS BASED ON FILE TYPE", filed Mar. 12, 2014, which claims the benefit of and priority to U.S. Provisional Patent Application 61/784,074, titled "ATTACHING APPLICATIONS BASED ON FILE TYPE", filed Mar. 14, 2013, and which is hereby incorporated by reference in its entirety.

TECHNICAL BACKGROUND

Real computing devices, such as desktop computers and servers, and virtual computing devices, such as virtual machines, are capable of storing a variety of files in a variety of file types. These file types are typically only read or manipulated by specific applications that are designed or tailored for the specific file types. For example, a file in Portable Document Format or PDF may only be read by a reader application, such as Adobe's Acrobat Reader or some other reader application.

Typically, when a user needs to access a specific file type, the user may need to search for and install the appropriate application. This process takes time, as the user must first search for an appropriate application, and wait for the appropriate application to install on the computing device. Once installed, the user may view and manipulate the file within parameters of the installed application.

Overview

Methods, systems, and software are included herein for attaching applications based on file formats. In a particular example, a method of dynamically making applications available to a computing device includes identifying an application attach triggering event based on a file selection of a certain file type on the computing device. The method further includes, in response to the application attach triggering event, identifying an application within an application volume based on the certain file type. The method also includes attaching the application volume to computing device, and associating the application to the certain file type on the computing device.

In another instance, a computer apparatus to dynamically make applications available to a computing device includes processing instructions that direct an application attaching system to identify an application attach triggering event based on a file selection of a certain file type on the computing device. The processing instructions further direct the application attaching system to, in response to the triggering event, identify an application within an application volume based on the certain file type. Further, the processing instructions direct the application attaching system to attach the application volume to the computing device and associate the application to the certain file type on the computing device. The computer apparatus further includes one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Computing devices, both real and virtual, typically include a variety of applications and files to accomplish an assortment of tasks. These files may be stored in a variety of file formats, including DOC format, Joint Photographic Experts Group (JPEG) format, and Portable Document Format (PDF), among a variety of other file formats. Although the computing device may be capable of storing the variety of different file formats, the computing device may not necessarily have the appropriate application to open and modify each of the file formats stored on the device.

In the present example, to provide new applications, the computing devices are connected to an attachable storage repository, which includes one or more applications that can be dynamically attached to the computing device. When a user or some other process on the computing device selects a file, the computing device is configured to determine whether an application is prepared to open and manipulate the requested file. If an application is already available on the device for the file type, the device will execute the application and process the file accordingly. In contrast, if an application is not available for the file type, the computing device will identify an application attach triggering event based on the file selection.

In response to the application attach triggering event, an application manager that may reside wholly or partially on the computing device is configured to identify an application to support the file type of the selected file. Once the application is identified, the application is dynamically attached to computing system. In some examples, the act of attaching the application may include mapping, mounting, or otherwise making available the appropriate storage volume containing the application to the computing system, and modifying registry keys, file paths, and other information to make the application appear as though it has been locally installed. In other instances, such as the example with a real computing device, the volume containing the application may be mapped and registry settings changed to direct future calls of that file type to the application stored in the storage repository.

Figure 1:
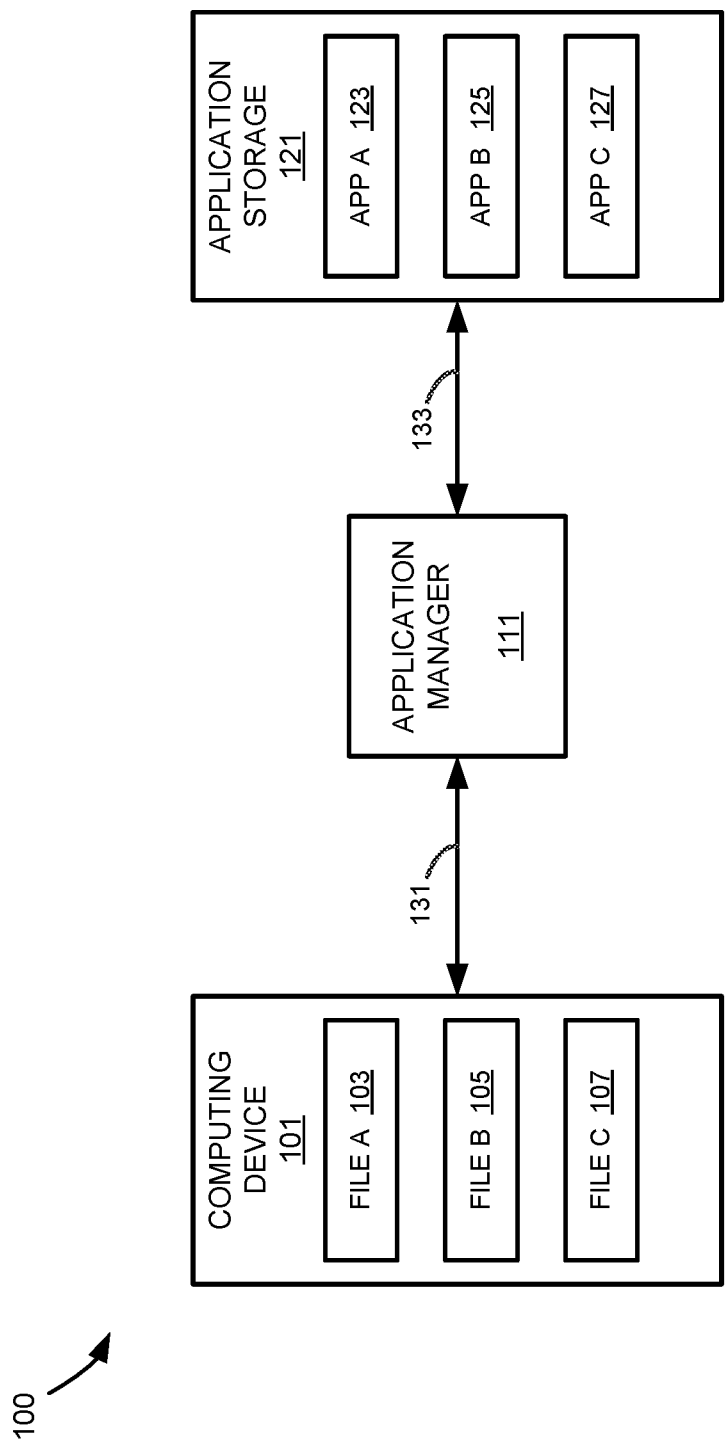
FIG. 1 illustrates an application attaching system according to one example.

To further illustrate the dynamic attachment of applications based on file type, FIG. 1 is included. FIG. 1 illustrates an application attaching system 100 according to one example. Application attaching system 100 includes computing device 101, application manager 111, and application storage 121. Computing device 101 includes file A 103, file B 105, and file C 107. Application Storage 121 includes application A 123, application B 125, and application C 127. Computing device 101 communicates with application manager 111 over communication link 131 and application manager 111 further communicates with application storage 121 over communication link 133.

In operation, computing device 101 is configured to store a variety of files in a variety of file types. These files may include PDF files, DOC files, JPEG files, or files of any other file type. Although computing device 101 may store a variety of files and file types, computing device 101 may not include the appropriate application to read or manipulate all of the file types stored on the device. For example, computing device 101 may include applications to process and open file A 103 and file B 105, but may lack an application for file C 107. In such situations, a new application will need to be added to computing device 101 to read or manipulate the specific file type for file C 107.

Figure 2:
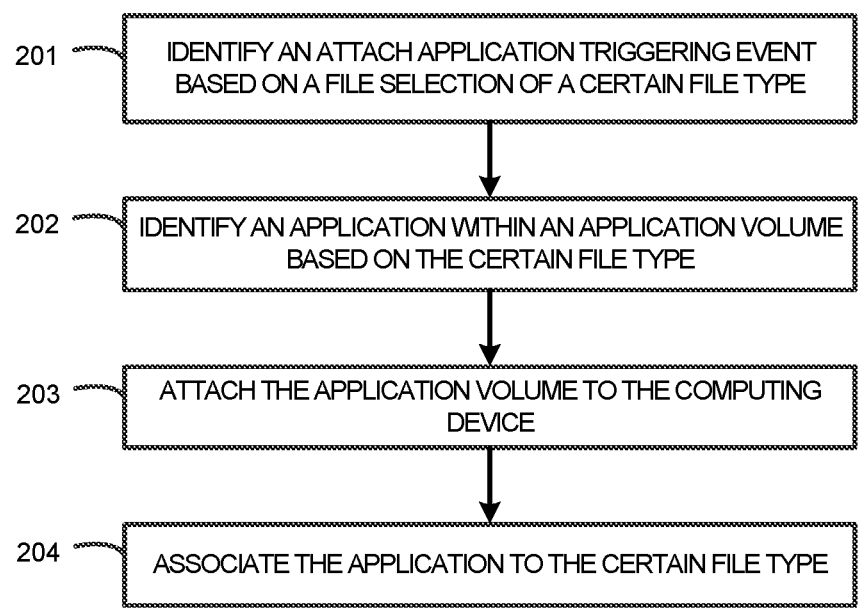
FIG. 2 illustrates a method for operating an application attaching system according to one example.

As a further illustration of the operation of application attaching system 100, FIG. 2 is included. FIG. 2 illustrates a flow diagram for operating an application attaching system according to one example. As illustrated, application manager 111 is configured to identify an attach application triggering event based on a file selection of a certain file type (201). An attach application triggering event may include situations where a file type is incapable of being read or manipulated by computing device 101. In one example, application manager 111 may be the default file type handler for computing device 101. Thus, if an application is installed on computing device 101 to handle a specific file type, application manager 111 will not be called when the file type is selected. However, if an application is not available, application manager 111 will accept the call for the file type as an attach application triggering event.

In response to the attach application triggering event, application manager 111 will identify the appropriate application and application volume to attach to computing device 101 based on the certain file type (202). In some examples, a storage repository, such as application storage 121, may be made available to application manager 111 and computing device 101. This storage repository may include one or more storage volumes that comprise applications to be attached to various computing devices.

Following the identification of the application, application manager 111 will initiate attachment of the application to computing device 101 (step 203). In one example of attaching the application volume, application manager 111 can mount or map the location of the application for computing device 101. For example, application manager 111 could provide Adobe Acrobat Reader if needed by creating a path to the application package. Once mounted or mapped, the application may then be associated to all future calls of that file type (204).

Figure 4:
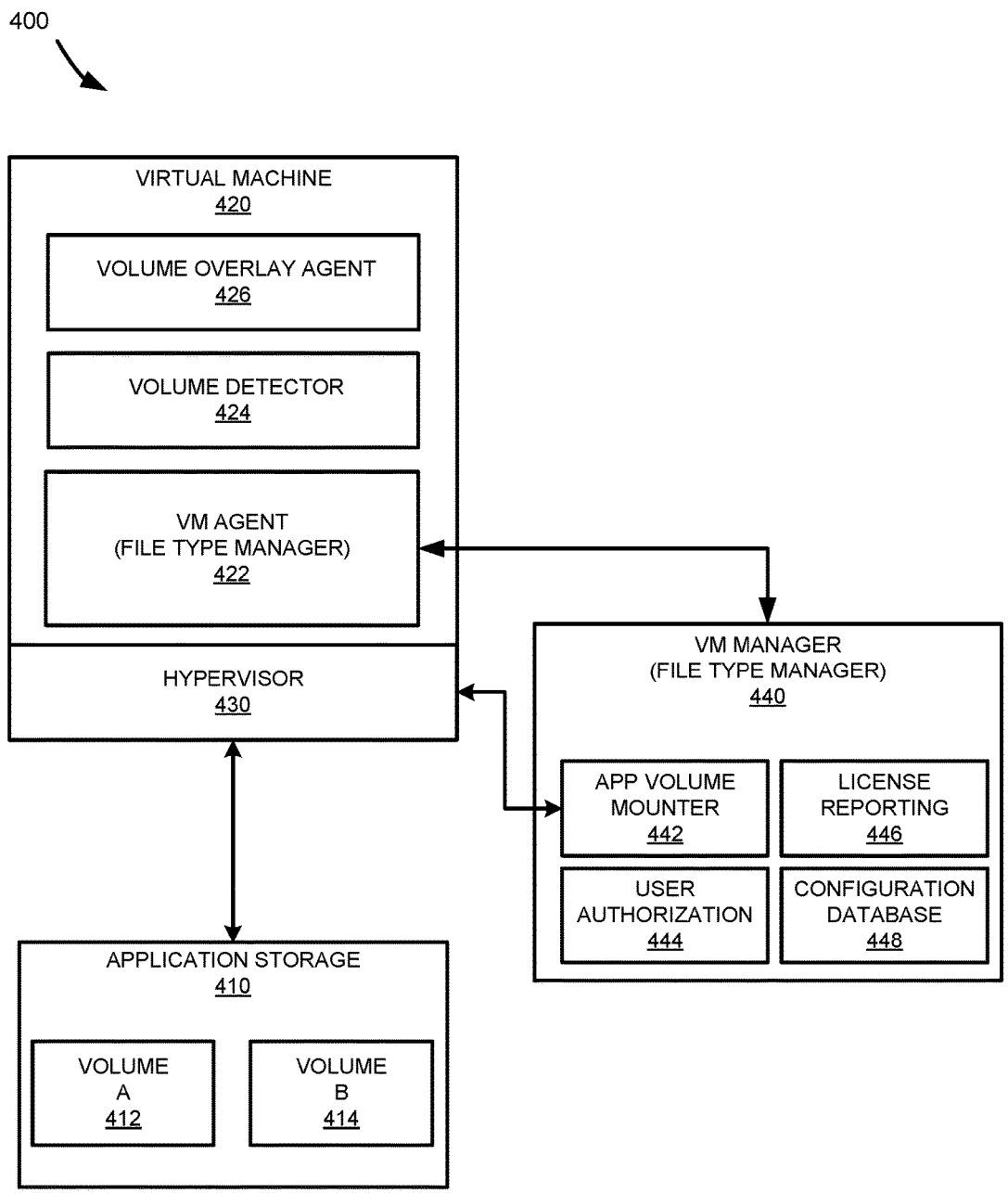
FIG. 4 illustrates an application attaching environment according to one example.

In a further example, specifically if computing device 101 is a virtual machine, the application files could be dynamically attached or mounted to computing device 101 as further described in FIG. 4. For example, the volume or virtual storage element to handle PDF files could be dynamically attached and placed in certain path, such as \\file_share\\apps\pdf.vhd. Thus, any future PDF will be registered to open the application in the specified path.

Returning to FIG. 1, computing device 101 may include a desktop computer, a laptop computer, a server computer, or any other similar computing device. Alternatively, computing device 101 may include a virtual copy of a computing device, such as a virtual copy of a desktop computer, laptop computer, server computer, or any other virtual machine. The virtual machines can execute on a hypervisor, which abstracts the physical hardware of the real machine such that the virtual machine sees virtual hardware regardless of the real hardware includes.

Application manager 111 can include one or more computer systems, custom hardware, or other devices capable of identifying an attach application triggering event, identifying an application based on the attach application triggering event, and initiating attachment of the application to the computing device. Although illustrated as a separate device in FIG. 1, it should be understood that application manager 111 might be implemented wholly or partially within computing device 111.

Application storage 121 may include any device capable of storing applications such as application A 123, application B 125, and application C 127, and providing the applications to computing device 101. Examples of application storage 121 can include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the applications. The applications within application storage 121 may be stored in various application volumes. These application volumes may include real storage elements, such as hard disks and hard disk partitions, or may include virtual storage elements, such as virtual hard disks or other virtual elements.

Communication links 131 and 133 use metal, glass, air, space, or some other material as the transport media. Communication links 131 and 133 could use various communication protocols, such as Time Division Multiplex (TDM), Internet Protocol (IP), Ethernet, communication signaling, code division multiple access (CDMA), Evolution-Data Optimized (EVDO), WIMAX, Global System for Mobile communication (GSM), Long-Term Evolution (LTE), WIFI, High Speed Packet Access (HSPA), or some other communication format—including combinations thereof. Communication links 131 and 133 could be direct links or may include intermediate networks, systems, or devices.

Figure 3:
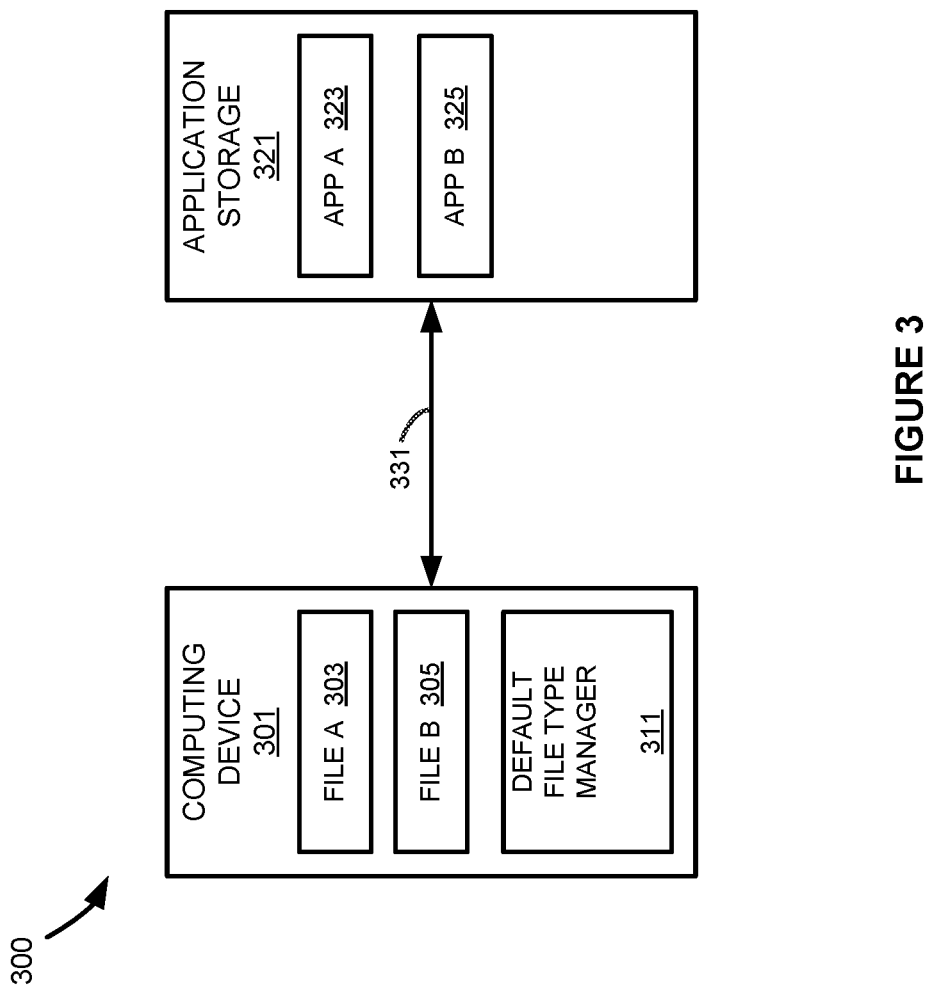
FIG. 3 illustrates an application attaching environment according to one example.

FIG. 3 illustrates an application attaching environment 300 according to one example. Application attaching environment 300 includes computing device 301 and application storage 321. Computing device 301 further includes file A 303, file B 305, and default file type manager 311. Application storage 321 further includes application A 323 and application B 325. Computing device 301 communicates with application storage 321 using communication link 331. In the present example, default file type manager 311 is an implementation of application manager 111.

Computing device 301 may represent a desktop computer, a laptop computer, a server computer, or any other similar computing device. Alternatively, computing device 301 may include a virtual copy of a computing device, such as a virtual copy of a desktop computer, laptop computer, server computer, or any other virtual machine. The virtual machines can execute on a hypervisor, which abstracts the physical hardware of the real machine such that the virtual machine sees virtual hardware regardless of the real hardware includes.

Application storage 321 can include any device capable of storing applications such as application A 323, and application B 325. Examples of application storage 321 can include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the applications.

Communication link 331 uses metal, glass, air, space, or some other material as the transport media. Communication link 331 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 331 could be a direct link or may include intermediate networks, systems, or devices.

In operation, computing device 301 can use default file type manager 311 as a default file type handler. For example, file A may need to be read or manipulated by computing device 301. If no installed application is capable of reading or manipulating the file, default file type manager 311 will be initiated. This initiation will be taken as an attach application triggering event. Alternatively, if file B needs to be read or manipulated by computing device 301 and an application is installed to read or manipulate that file type, then the appropriate application will be executed by computing device 301.

In situations where default file type manager 311 receives an attach application triggering event, default file type manager 311 will identify the appropriate application to handle the file type. In some examples, default file type manager 311 may include a look up table of applications for particular file types. For example, if file A 303 required an application, a look up table may match file A 303 to application A 323.

Following the identification of the appropriate application, default file type manager 311 may attach the appropriate application and application storage volume. In at least one example, default file type manager may mount or map a drive to the needed application package. For example, if application A 323 is needed for file A 303, default file type manager 311 can map a drive to the storage volume containing application A 323. Default file type manager 311 will then create a path to the storage volume for all future calls of the same file type as file A 303. In some examples, the attached application may also have the capability of handling other file types, thus, default file type manager 311 may also create a path for the other file types handled by the attached application.

FIG. 4 illustrates an application attaching environment 400 according to one example. Application attaching environment 400 includes application storage 410, virtual machine 420, hypervisor 430, and virtual machine (VM) manager 440. Application storage 410 includes application volume A 412 and application volume B 414. Virtual machine 420 includes volume overlay agent 426, volume detector 424, and VM agent 422. VM manager 440 includes application volume mounter 442, license reporting 446, user authorization 444, and configuration database 448. In the present example, the combination of VM Agent 422 and VM manager 440 are an implementation of application manager 111.

In operation, virtual machine 420 will operate on top of hypervisor 430, which is used as a service to abstract a physical host server. Hypervisor 430 will abstract the physical hardware of the host server so that the virtual machine sees virtual hardware regardless of what the underlying hardware actually comprises. Virtual machine 420 will typically include a full operating system that will often need to read or manipulate different file types in operation. During the operation of virtual machine 420, the machine may encounter a file type that is incapable of being read or manipulated without a specific application. When this occurs, an application triggering event will be identified by VM agent 422.

In some examples, VM agent 422 may then use a look up table to find the appropriate application for the file type. VM agent 422 may then pass along the identifier of the application to VM manager 440. In an alternative example, VM agent 422 may identify the file type and pass the file type to VM manager 440. VM manager 440 may then look up the appropriate application to attach based on the file type.

Following the identification of the application, VM manager 440 will identify the appropriate volume 412-414 that includes the identified application. Once VM manager 440 has selected the relevant storage volume based on the identified application, VM manager 440 directly or indirectly contacts hypervisor 430 and requests the storage volume to be attached to virtual machine 420 (the "target VM"). For example, VM manager 440 could directly request volume A 412 to be attached to the target VM by connecting to the hypervisor or cloud infrastructure. Alternatively, VM manager 440 could indirectly request application volumes to be attached to the target virtual machine 420 by connecting to a virtual datacenter manager responsible for managing several hypervisors or cloud platforms. Further, load balancers or application brokers may be utilized with the system to help control or optimize the management of data by environment 400.

In at least one example, virtual machine 420 may include volume detector 424. Volume detector 424 can be configured to detect when a new storage volume has been attached to virtual machine 420. In one instance, this can be a file system filter driver. In another example, this may be a file system mini-filter driver. In another occurrence, this can be a service configured to detect when new storage devices have been attached. Once a new storage volume has been detected, a volume overlay software agent will be invoked (volume overlay agent 426). This volume overlay agent may be part of volume detector 424 or may be a separate driver as shown. The volume overlay agent is responsible for exposing the application contained in the storage volume and making it available to virtual machine 420.

Volume overlay agent 426 may accomplish this by overlaying the content (such as files and registry keys) into the VM so that the content can be seamlessly integrated into the VM. In addition, if one or more applications contained in a storage volume are meant to start automatically, then the VM agent can enumerate the contents of the volume and automatically start the relevant services or drivers. For example, the VM agent can enumerate all start registry values to look for services contained in the HKEY_LOCAL_MACHINE\SYSTEM\CurrentControl Set\Services subtree that should be automatically started and invoke the relevant APIs (such as ZwLoadDriver and StartService).

VM agent 422 is configured to respond automatically to storage volumes 412 and 414 as they are attached containing the specific file type applications. VM agent 422, in various examples, could be a service, a Unix daemon, or a script.

VM agent 422 may be configured to detach storage volumes upon detection of specific triggering events. These events could include the user shutting down the virtual machine, logging off the virtual machine, or any other event designated a detached triggering event. VM agent 422 may also be configured to detect the attached volumes and look for known load points, such as HKEY_LOCAL_MACHINE\CurrentControlSet\Services.

The storage attached to virtual machine 420 can be in any form supported by hypervisor 430 and the operating system of virtual machine 420. The storage attached to the virtual machine may contain multiple partitions, volumes, and file systems. The storage attached to the virtual machine can be any type supported by the cloud infrastructure. In one example, the storage attached to the virtual machine can be attached through a network (using protocols such as iSCSI or Fibre Channel which reference storage by LUNs, or logical unit numbers). In another instance, the storage attached to the virtual machine is directly attached from physical volumes (raw device mapping), such as a hard disk and hard disk partitions and the hypervisor with pass through access from the virtual machine directly to the hardware. In another example, the storage attached to the virtual machine can be a virtual device represented by a file (an ISO representing a virtual CD-ROM or a virtual hard disk file such as the VMDK and VHD file formats which represent a disk).

The storage attached to the virtual machine does not need to be contained within a single physical device or single virtual device represented by a file. The storage may be in the form of different virtual hard disk files or physical devices attached simultaneously which represent "physical volumes" within the virtual machine. These physical volumes will be composed of logical volumes. This approach, known as storage virtualization, allows logical volumes to be abstracted from the underlying physical storage. A logical volume (itself containing a file system) spread out across multiple physical volumes can lead to improved redundancy and performance.

Although illustrated separately, it should be understood that VM manager 440 may be implemented on one or more computing devices, and may be wholly or partially implemented within hypervisor 430.

Figures 5, 6:
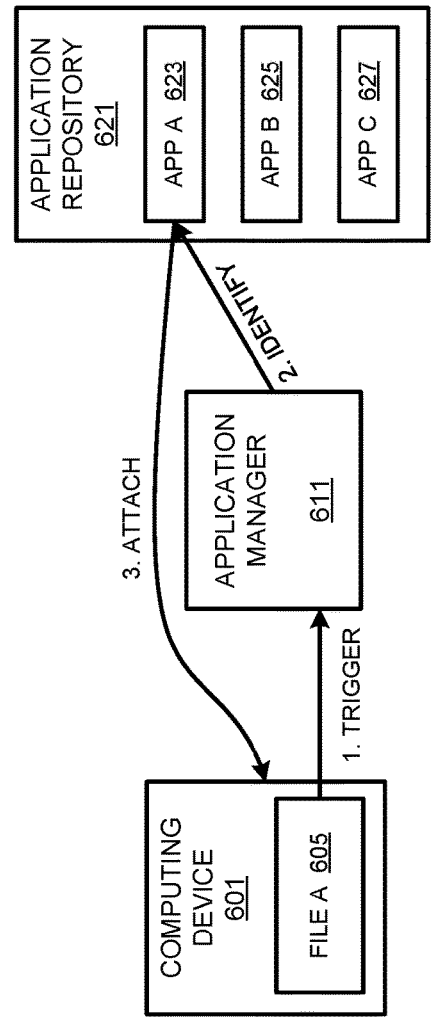
FIG. 5 illustrates an association table between file types and applications according to one example.
FIG. 6 illustrates an overview of attaching an application in response to an attach triggering event.

FIG. 5 illustrates an association table 500 between file types and applications, which may be used by an application manager, such as application manager 111, to dynamically attach applications based on file type. Although illustrated as a table in the present example, it should be understood that an application manager might use any data structure that relates file types to applications. Association table 500 includes file types 510 and applications 520.

In operation, a computing device, either real or virtual, may include a large variety of files comprising a large variety of file types. When a user or some other process wishes to open a file, the device is configured to identify the application associated with the file type and execute that application for the file. In some instances, an application may not be prepared or installed for every file type. Accordingly, when one of these file types is identified, the computing device may use an application manager, such as application manager 111, to identify the appropriate application.

In the present example, the application manager uses association table 500 to determine the appropriate application. For example, if a user or some other process desired to open a file with file type A, the application manager may use association table 500 to identify application Alpha as necessary for that file type. Once application Alpha is identified, the application manager may identify the volume that contains the application, and attach or mount the volume to the computing device. Once the volume is attached, the application manager may ensure that registry files and other necessary pointers direct all future selections of that file type to be executed with the attached application.

Further, as illustrated in association table 500, application Alpha is assigned for both file type A and file type C. Accordingly, the application manager may also direct all future requests of file type C to be executed with application Alpha. Although illustrated with four file types in the present example, it should be understood that association table 500 might include any number of file types associated with any number of applications. Once a file is selected that does not have an executable application, the application manager may use association table 500 to provide the necessary application.

Turning to FIG. 6, FIG. 6 illustrates an overview operating an application attaching system to provide applications to a computing device based on file type. FIG. 6 includes computing device 601, application manager 611, and application repository 621. Although illustrated separate from computing device 601, it should be understood that application manager 611 might be implemented wholly or partially on computing device 601.

As illustrated, application manager 611 is configured to identify an attach application triggering event based on the selection of file A 605 on computing device 601. In some examples, computing device 601 may not have access to an application that can process file A. Responsively, application manager 611 is configured to identify that an application is absent, identify the appropriate application from a list of default applications, and initiate the attachment of the identified application to computing device 601. As illustrated in the example, application manager 611 identifies application A 623 to be used with file A 605. Responsive to this selection, the storage volume within application repository 621 that includes the files and other necessary data for the application is attached, mounted, mapped, or otherwise made available to computing device 601. Once the storage volume is made available, computing device 601 may modify registry keys and file paths to ensure that application A 623 is used for files of the same file type as file A 605. In some examples, application A 623 may be identified as the appropriate application for other file types that are stored on computing device 601. As a result, registry keys and other file paths may be modified to ensure that application A 623 is used for the other file types.

Figure 7:
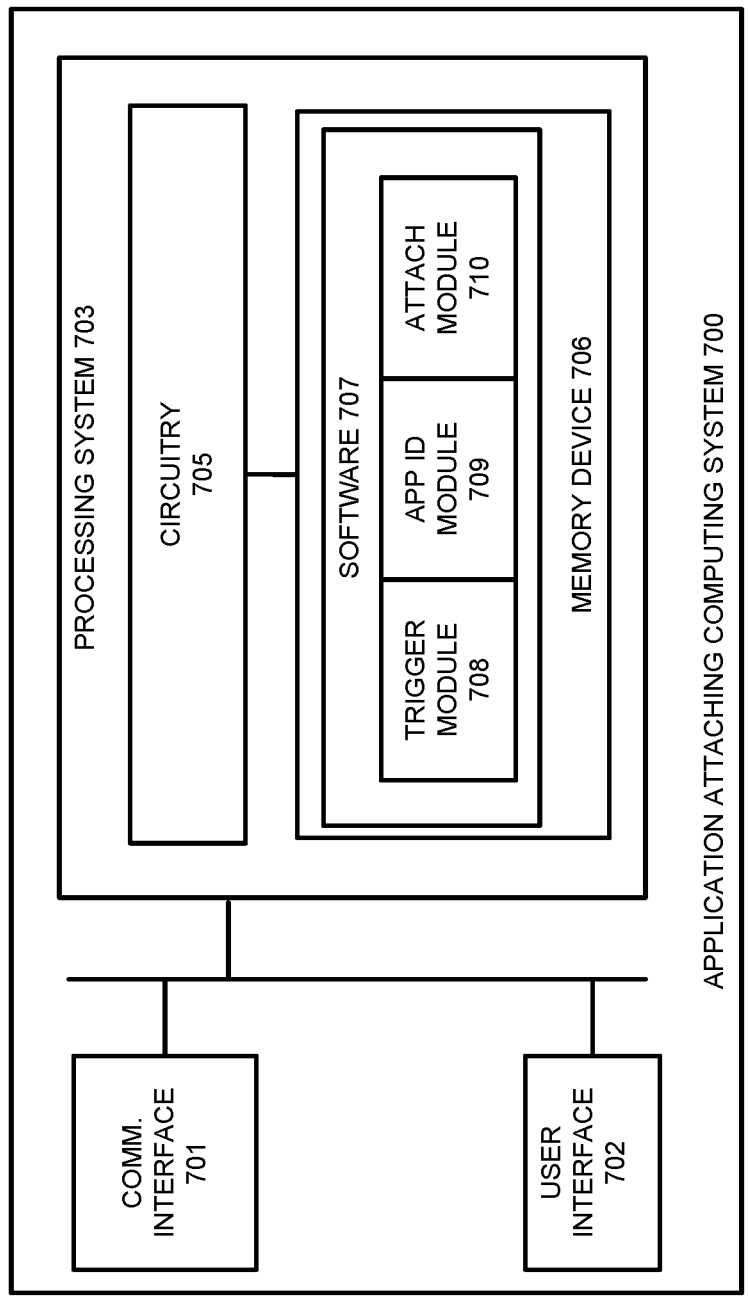
FIG. 7 illustrates an application attaching computing system according to one example.

FIG. 7 illustrates an application attaching computing system 700. Application attaching computing system 700 is an example computing system to implement application attaching system 100, although alternative configurations are possible. Application attaching computing system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes trigger module 708, application identifier module 709, and attach module 710. Operating software 707 may further include an operating system, utilities, drivers, network interfaces, applications, or some other type of software. When executed by circuitry 705, operating software 707 directs processing system 703 to operate application attaching computing system 700 as described herein.

In a particular example, computing system 700 is configured to attach applications to a computing device based on a file type selection. Trigger module 708 is configured to identify an attach application triggering event, which occurs when a computing device requires an application to read or modify a specific file type. Once the triggering event is identified, application identifier module 709 is configured to identify an application volume and application associated with the file type, and attach module 710 is configured to initiate the attachment of the identified application to the computing device. In some examples, the attachment of the application may include mapping, mounting, or otherwise making the application available within the computing device. Once made available, registry data and other information may be modified to associate the application with the particular file type. Further, once made available, the application may be initialized to handle the original file request.

Although application attaching computing system 700 includes three software modules in the present example, it should be understood that functionality could be achieved with one or more software modules. Additionally, although application manager computing system appears as a single device, it should be understood that application attaching computing system 700 may be implemented on one or more devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an application attaching system to dynamically make applications available to a computing device, the method comprising:
   identifying an application attach triggering event based on a file selection of a certain file type on the computing device;
   in response to the application attach triggering event, identifying an application within an application volume based on the certain file type, wherein the application volume comprises a virtual or physical storage element;
   in response to identifying the application, mounting the application volume to the computing device;
   modifying one or more registry keys on the computing device to make the application executable on the computing device from the application volume; and
   executing files for the application stored on the application volume to support the file selection.

2. The method of claim 1 wherein the computing device comprises a physical computing device.

3. The method of claim 1 wherein the computing device comprises a virtual computing device executing via a hypervisor.

4. The method of claim 1 wherein the file selection comprises a user selection of a file.

5. The method of claim 1 wherein the application volume comprises a virtual hard disk file.

6. The method of claim 1 further comprising associating the application to the certain file type on the computing device.

7. The method of claim 6 further comprising associating the application to other file types on the computing device.

8. The method of claim 6 wherein associating the application to the certain file type on the computing device comprises placing the application volume in a designated path for the certain file type.

9. The method of claim 1 wherein identifying the application attach triggering event based on the file selection of the certain file type on the computing device comprises:
   identifying the file selection of the certain file type;
   identifying whether an executable application on the computing device is available to service the file selection; and
   if an executable application is not available on the computing device to service the file selection, identifying the file selection as the application attach triggering event.

10. An apparatus comprising:
    one or more non-transitory computer readable storage media; and
    processing instructions stored on the one or more non-transitory computer readable storage media to dynamically make applications available to a computing device that, when read and executed by a processing system, direct the processing system to at least:
    identify an application attach triggering event based on a file selection of a certain file type on the computing device;
    in response to the application attach triggering event, identify an application within an application volume based on the certain file type, wherein the application volume comprises a virtual or physical storage element;
    in response to identifying the application, mount the application volume to the computing device;
    modify one or more registry keys on the computing device to make the application executable on the computing device from the application volume; and
    execute files for the application stored on the application volume to support the file selection.

11. The apparatus of claim 10 wherein the computing device comprises a virtual computing device executing via a hypervisor.

12. The apparatus of claim 10 wherein the file selection comprises a user selection of a file.

13. The apparatus of claim 10 wherein the application volume comprises a virtual hard disk file.

14. The apparatus of claim 10 wherein the processing instructions further direct the processing system to associate the application to the certain file type on the computing device.

15. The apparatus of claim 14 wherein the processing instructions further direct the processing system to associate the application to other file types on the computing device.

16. The apparatus of claim 14 wherein the processing instructions to associate the application to the certain file type on the computing device direct the processing system to place the application volume in a designated path for the certain file type.

17. The apparatus of claim 10 wherein the processing instructions to identify the application attach triggering event based on the file selection of the certain file type on the computing device direct the processing system to:
    identify the file selection of the certain file type;
    identify whether an executable application is available on the computing device to service the file selection; and
    if an executable application is not available on the computing device to service the file selection, identify the file selection as the application attach triggering event.

18. A computing apparatus comprising:
    one or more non-transitory computer readable storage media;
    a processing system operatively coupled with the one or more non-transitory computer readable storage media; and
    processing instructions stored on the one or more non-transitory computer readable storage media to dynamically make applications available to a computing device that, when read and executed by a processing system, direct the processing system to at least:
        identify an application attach triggering event based on a file selection of a certain file type on the computing device;
        in response to the application attach triggering event, identify an application within an application volume based on the certain file type, wherein the application volume comprises a virtual or physical storage element;
        in response to identifying the application, mount the application volume to the computing device;
        modify one or more registry keys on the computing device to make the application executable on the computing device from the application volume; and
        execute files for the application stored on the application volume to support the file selection.

19. The computing apparatus of claim 18 wherein the computing device comprises a virtual machine executed by a hypervisor.

20. The computing apparatus of claim 19 wherein the application volume comprises a virtual hard disk file.

* * * * *